(12) United States Patent
Tanaka et al.

(10) Patent No.: US 10,315,864 B2
(45) Date of Patent: Jun. 11, 2019

(54) PALLETIZING SYSTEM FOR LOADING ARTICLES ON PALLET

(71) Applicant: FANUC CORPORATION, Yamanashi (JP)

(72) Inventors: Akira Tanaka, Yamanashi (JP); Toshimichi Yoshinaga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 140 days.

(21) Appl. No.: 15/655,213

(22) Filed: Jul. 20, 2017

(65) Prior Publication Data

US 2018/0022557 A1 Jan. 25, 2018

(30) Foreign Application Priority Data

Jul. 22, 2016 (JP) ................... 2016-144391

(51) Int. Cl.
| | |
|---|---|
| *G06F 7/00* | (2006.01) |
| *B65G 57/03* | (2006.01) |
| *B65G 57/24* | (2006.01) |
| *B65B 11/04* | (2006.01) |
| *B65G 61/00* | (2006.01) |
| *B65G 57/28* | (2006.01) |
| *B65B 57/20* | (2006.01) |

(52) U.S. Cl.
CPC .......... *B65G 57/035* (2013.01); *B65B 11/045* (2013.01); *B65G 57/245* (2013.01); *B65G 61/00* (2013.01); *B65B 57/20* (2013.01); *B65G 57/28* (2013.01)

(58) Field of Classification Search
None
See application file for complete search history.

(56) References Cited

U.S. PATENT DOCUMENTS

| | | | |
|---|---|---|---|
| 2007/0262001 A1 | 11/2007 | Hansen et al. | |
| 2010/0228385 A1* | 9/2010 | Beck | B65G 1/1378 700/217 |
| 2011/0106295 A1* | 5/2011 | Miranda | B65G 1/1378 700/216 |
| 2014/0308098 A1* | 10/2014 | Lert | B65G 1/0492 414/281 |
| 2018/0009605 A1* | 1/2018 | Collin | B65G 1/127 |

FOREIGN PATENT DOCUMENTS

| | | |
|---|---|---|
| JP | H03192026 A | 8/1991 |
| JP | H03205223 A | 9/1991 |
| JP | H08-91579 A | 4/1996 |
| JP | H08143160 A | 6/1996 |
| JP | H10087037 A | 4/1998 |
| JP | 2002338047 A | 11/2002 |

* cited by examiner

*Primary Examiner* — Yolanda R Cumbess
(74) *Attorney, Agent, or Firm* — RatnerPrestia

(57) ABSTRACT

A palletizing system capable of conserving space in an area for buffer conveyors. The palletizing system includes a supply conveyor for conveying a first type of article and a second type of article, a type detection sensor for detecting the type of the article, a first buffer conveyor for conveying the first type of article, a second buffer conveyor for conveying the second type of article, which is disposed above the first buffer conveyor, a sorting robot which places the first type of article on the first buffer conveyor and which places the second type of article on the second buffer conveyor, and a loading robot which removes articles from the first buffer conveyor and the second buffer conveyor, to load the articles on a pallet.

5 Claims, 11 Drawing Sheets

US 10,315,864 B2

PALLETIZING SYSTEM FOR LOADING ARTICLES ON PALLET

BACKGROUND OF THE INVENTION

1. Field of the Invention

The invention relates to a palletizing system for loading articles on a pallet.

2. Description of the Related Art

Palletizing systems for loading articles on a pallet have been known (e.g., Japanese Unexamined Patent Publication (Kokai) No. 8-91579).

Conventionally, a sufficient area for a buffer conveyor, on which articles sorted according to category are to be placed, cannot be secured in some cases.

SUMMARY OF THE INVENTION

A palletizing system for loading a plurality of types of articles on a pallet includes a supply conveyor configured to convey a first type of article and a second type of article having a dimension different from that of the first type of article, and a type detection sensor configured to detect the type of the article conveyed by the supply conveyor.

The palletizing system includes a first buffer conveyor provided subsequent to the supply conveyor so as to convey the first type of article, and a second buffer conveyor provided subsequent to the supply conveyor at vertically upward of the first buffer conveyor so as to convey the second type of article.

The palletizing system includes a sorting robot configured to pick up the first type of article detected by the type detection sensor from the supply conveyor and place the first type of article on the first buffer conveyor, and configured to pick up the second type of article detected by the type detection sensor from the supply conveyor and place the second type of article on the second buffer conveyor.

The palletizing system includes a loading robot configured to pick up the first type of article from the first buffer conveyor and the second type of article from the second buffer conveyor, and load them on the pallet in accordance with a loading pattern which determines loading positions of the first type of article and the second type of article on the pallet.

The first buffer conveyor and the second buffer conveyor may respectively convey the first type of article and the second type of article in the same conveyance direction. The length of the first buffer conveyor in the conveyance direction may be longer than the length of the second buffer conveyor in the conveyance direction.

The downstream end of the first buffer conveyor in the conveyance direction may be spaced in the conveyance direction from the downstream end of the second buffer conveyor in the conveyance direction. The upstream end of the second buffer conveyor opposite the downstream end thereof may be spaced in the conveyance direction from the upstream end of the first buffer conveyor opposite the downstream end thereof.

The first type of article may have the dimension larger than that of the second type of article. The sorting robot or the loading robot may include a robot main body and a travel device configured to move the robot main body.

BRIEF DESCRIPTION OF THE DRAWINGS

The above-mentioned and other objects, features, and advantages of the invention will be clarified from the detailed description of embodiments illustrated in the accompanying drawings, in which.

DETAILED DESCRIPTION

Figure 1:
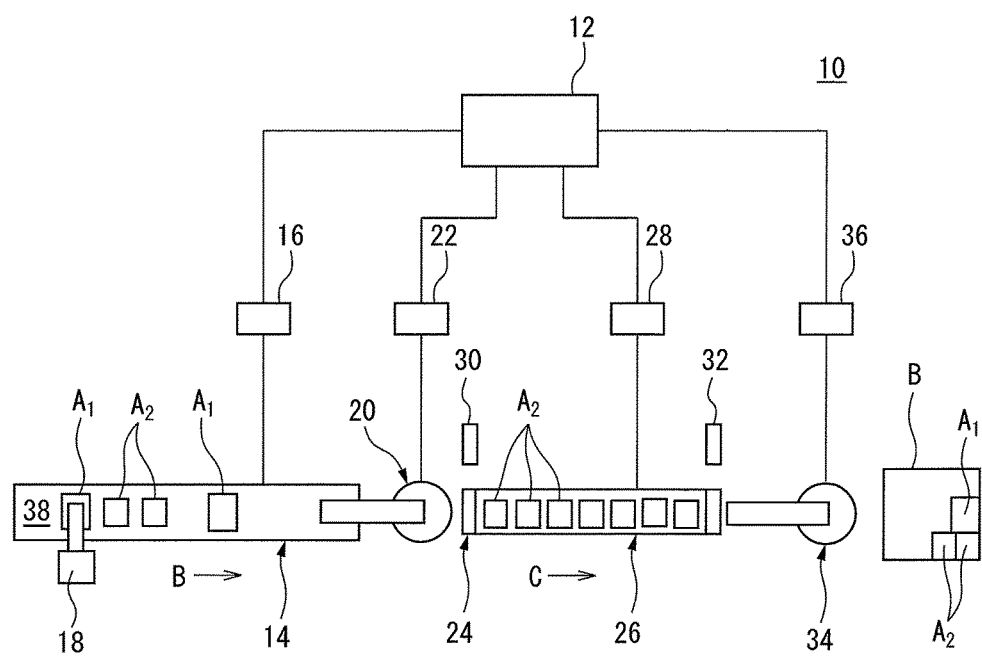
FIG. 1 is a schematic view of a palletizing system according to an embodiment.

Embodiments of the invention will be described below in detail with reference to the accompanying drawings. Note that, in the embodiments described below, similar elements are assigned the same reference numerals, and overlapping descriptions will be omitted.

With reference to FIGS. 1 to 5, a palletizing system 10 according to an embodiment will be described. The palletizing system 10 is for loading a first type of article $A_1$ and a second type of article $A_2$ different from the first type of article $A_1$ on a pallet B.

Figure 2:
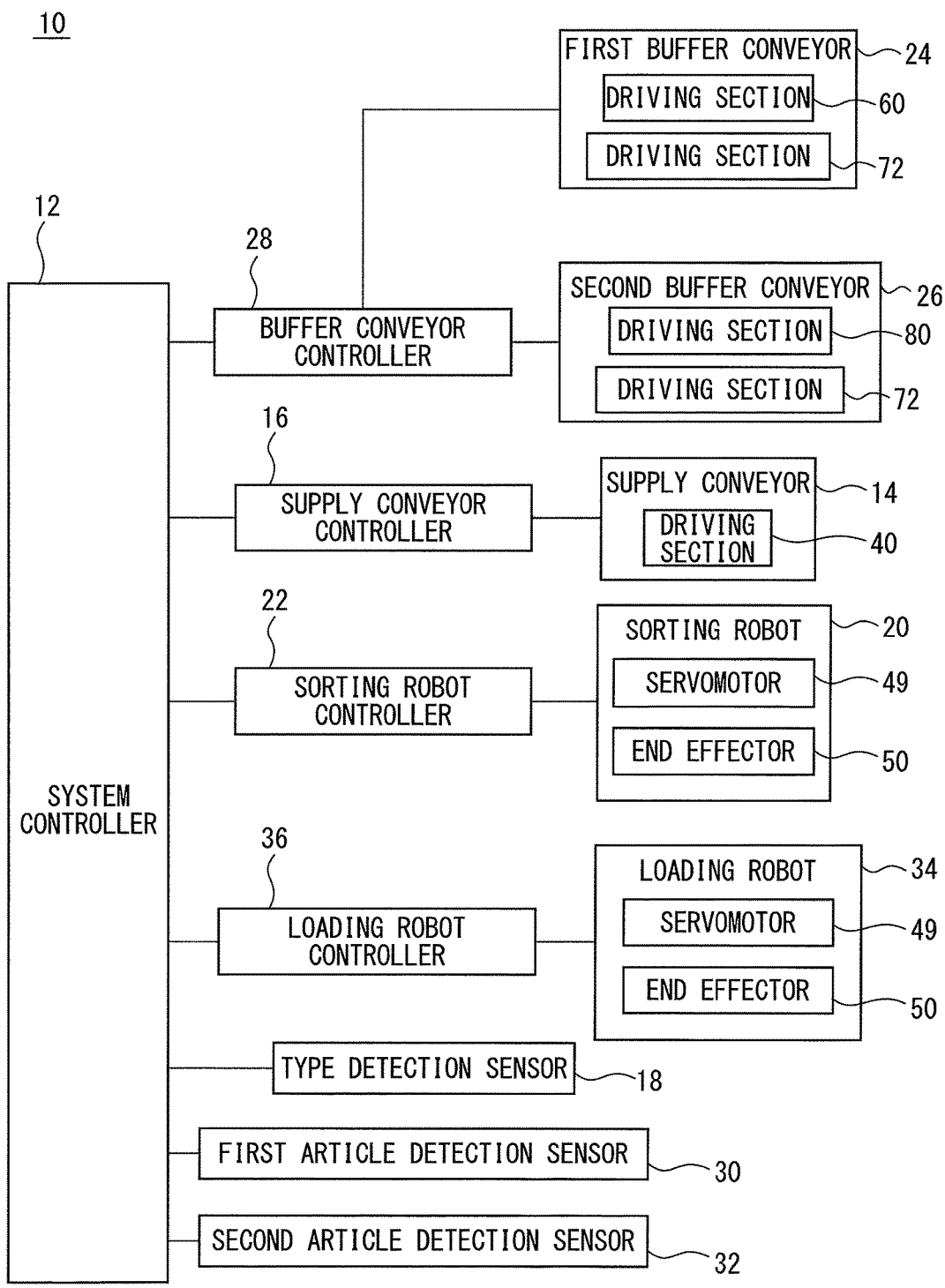
FIG. 2 is a block diagram of the palletizing system shown in FIG. 1.

As shown in FIGS. 1 and 2, the palletizing system 10 includes a system controller 12, a supply conveyor 14, a supply conveyor controller 16, a type detection sensor 18, a sorting robot 20, a sorting robot controller 22, a first buffer conveyor 24, a second buffer conveyor 26, a buffer conveyor controller 28, a first article detection sensor 30, a second article detection sensor 32, a loading robot 34, and a loading robot controller 36.

The system controller 12 includes a CPU and a memory (not shown), etc., and transmits commands to the supply conveyor controller 16, the type detection sensor 18, the sorting robot controller 22, the buffer conveyor controller 28, the first article detection sensor 30, the second article detection sensor 32, and the loading robot controller 36, so as to comprehensively control the entire operation of the palletizing system 10.

The supply conveyor 14 conveys the articles $A_1$ and $A_2$ in a conveyance direction indicated by an arrow B in FIG. 1. Specifically, the supply conveyor 14 is e.g. a roller conveyor or a belt conveyor, and includes a movable section 38 (FIG. 1) on which the articles $A_1$ and $A_2$ are placed, and a driving section 40 (FIG. 2) configured to generate power for moving the movable part 38.

The driving section 40 includes e.g. a servomotor, and moves the movable section 38 in accordance with a command from the supply conveyor controller 16, thereby conveys the articles $A_1$ and $A_2$ placed on the movable section 38 in the conveyance direction B.

In this embodiment, the articles $A_1$ and $A_2$ are randomly placed on the upstream end of the supply conveyor 14 by an operator or robot (not shown). The first type of article $A_1$ has a dimension (e.g., length, width, or height) larger than that of the second type of article $A_2$.

The supply conveyor controller 16 includes a CPU and memory (not shown), etc., and transmits a command to the driving section 40 so as to drive the movable section 38 to move the articles $A_1$ and $A_2$ in the conveyance direction B.

The type detection sensor 18 is disposed in the vicinity of the upstream end of the supply conveyor 14, and configured to detect the types of the articles $A_1$ and $A_2$ conveyed by the supply conveyor 14. In this embodiment, the type detection sensor 18 includes a three-dimensional vision sensor, and images the articles $A_1$ and $A_2$ conveyed by the supply conveyor 14 so as to calculate the dimension of the imaged article $A_1$ or $A_2$.

Further, the type detection sensor 18 previously stores a data table representing the relationship between the types of the articles $A_1$ and $A_2$ and the dimensions of the articles $A_1$ and $A_2$. The type detection sensor 18 checks the dimension of the imaged article $A_1$ or $A_2$ against the data table, and identifies whether the imaged article is the first type of article $A_1$ or the second type of article $A_2$.

Further, the type detection sensor 18 calculates the position and posture of the imaged article $A_1$ or $A_2$. For example, the "position" can be defined as a position in the movable section 38 of the supply conveyor 14 in a direction perpendicular to the conveyance direction B. The "posture" can be defined by an inclination angle of the longitudinal direction (or the lateral direction) of the article $A_1$ or $A_2$ with respect to the conveyance direction B, when the article $A_1$ or $A_2$ is viewed from vertically upward.

The type detection sensor 18 transmits to the system controller 12 information of the identified type of the article $A_1$ or $A_2$ (i.e., the first type of article $A_1$ or the second type of article $A_2$) and information of its position and posture.

Figure 3:
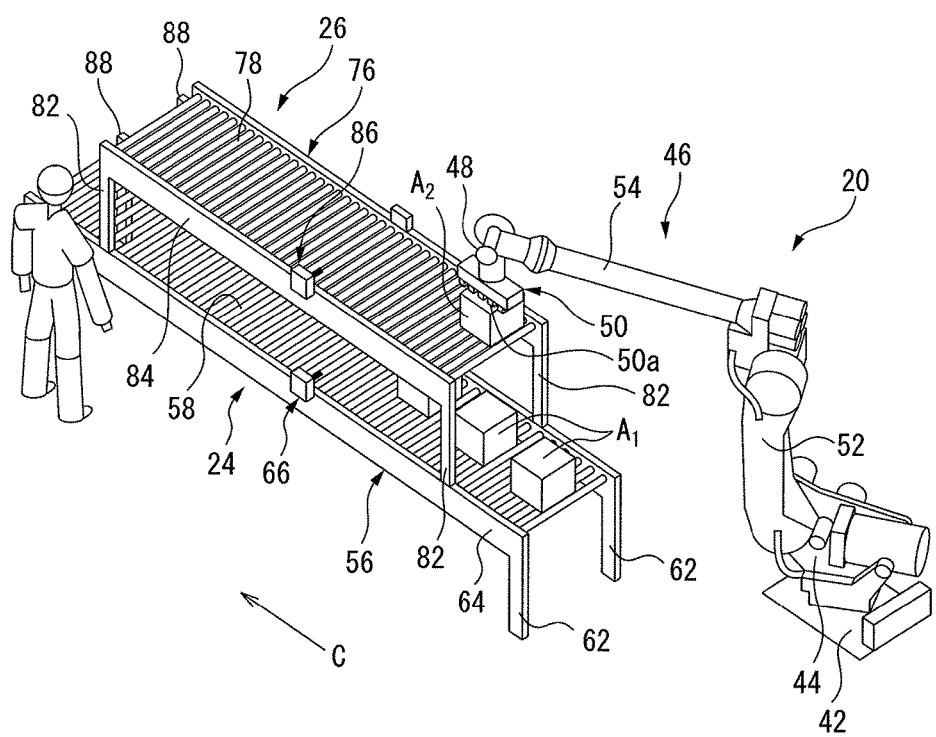
FIG. 3 is a perspective view of the sorting robot, first buffer conveyor, and second buffer conveyor shown in FIG. 1.

The sorting robot 20 is arranged adjacent to the downstream end of the supply conveyor 14. As shown in FIG. 3, the sorting robot 20 is a vertical articulated robot, and includes a robot base 42, a revolving drum 44, a robot arm 46, a wrist 48, and an end effector 50. The robot base 42 is fixed on a floor of a work cell. The revolving drum 44 is provided at the robot base 42 so as to revolve about a vertical axis.

The robot arm 46 includes an upper arm 52 rotatably coupled to the revolving drum 44, and a forearm 54 rotatably coupled to a distal end of the upper arm 52. The wrist 48 is attached to a distal end of the forearm 54, and supports the end effector 50 so as to be rotatable about three axes.

In this embodiment, the end effector 50 includes a plurality of suction sections 50a, and suctions and holds the articles $A_1$ and $A_2$. Each suction section 50a is comprised of e.g. a suction device of air-suction type or a sucker.

The sorting robot controller 22 includes a CPU and a memory (not shown), etc., and transmits commands to servomotors 49 (FIG. 2) built in the revolving drum 44, the robot arm 46 and the wrist 48, so as to dispose the end effector 50 at given position and posture. Further, the sorting robot controller 22 transmits a command to the end effector 50 so as to activate the suction sections 50a.

The sorting robot controller 22 operates the sorting robot 20 so as to place the first type of article $A_1$ conveyed by the supply conveyor 14 on the first buffer conveyor 24, and place the second type of article $A_2$ on the second buffer conveyor 26.

In this way, the articles $A_1$ and $A_2$ are sorted by the sorting robot 20 to be delivered to the first buffer conveyor 24 and the second buffer conveyor 26. This operation will be described later.

The first buffer conveyor 24 is fixed on the floor of the work cell so that the upstream end thereof is adjacent to the sorting robot 20. The first buffer conveyor 24 is e.g. a roller conveyor or belt conveyor, and is provided subsequent to the supply conveyor 14 so as to convey the first type of article $A_1$ in the conveyance direction indicated by an arrow C in the drawings.

Figure 4:
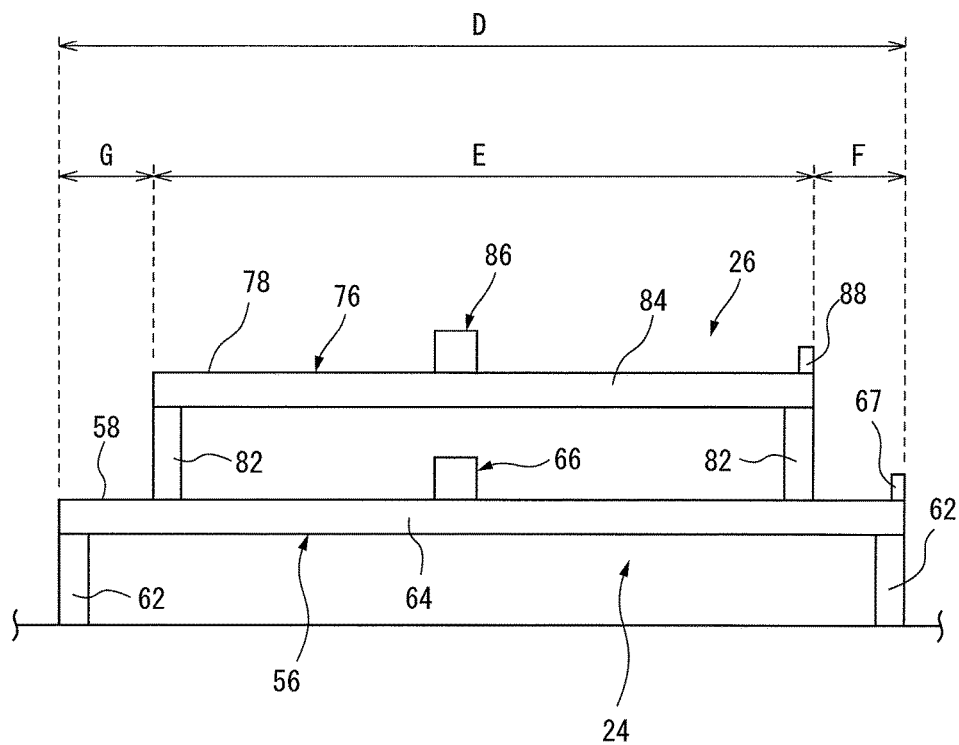
FIG. 4 is a side view of the first buffer conveyor and second buffer conveyor shown in FIG. 3.

As shown in FIGS. 3 and 4, the first buffer conveyor 24 includes a support frame 56, a movable section 58 movably provided at the support frame 56, and a driving section 60 (FIG. 2) configured to generate power for moving the movable section 58.

The support frame 56 includes a plurality of legs 62 and support 64 secured to the top ends of the legs 62. Each leg 62 is fixed on the floor of the work cell and vertically extends. The support 64 supports the movable section 58 so as to be movable.

The first type of article $A_1$ is placed on the movable section 58 by the sorting robot 20. The driving section 60 includes e.g. a servomotor, and moves the movable section 58 in response to a command from the buffer conveyor controller 28, thereby conveys the article $A_1$ placed on the movable section 58 in the conveyance direction C. In this embodiment, the conveyance direction B is substantially parallel to the conveyance direction C.

The first buffer conveyor 24 further includes a positioning section 66 and an anti-drop wall 67. The positioning section 66 is configured to position the article $A_1$ placed on the movable section 58 of the first buffer conveyor 24 at a predetermined position and posture.

Figure 5:
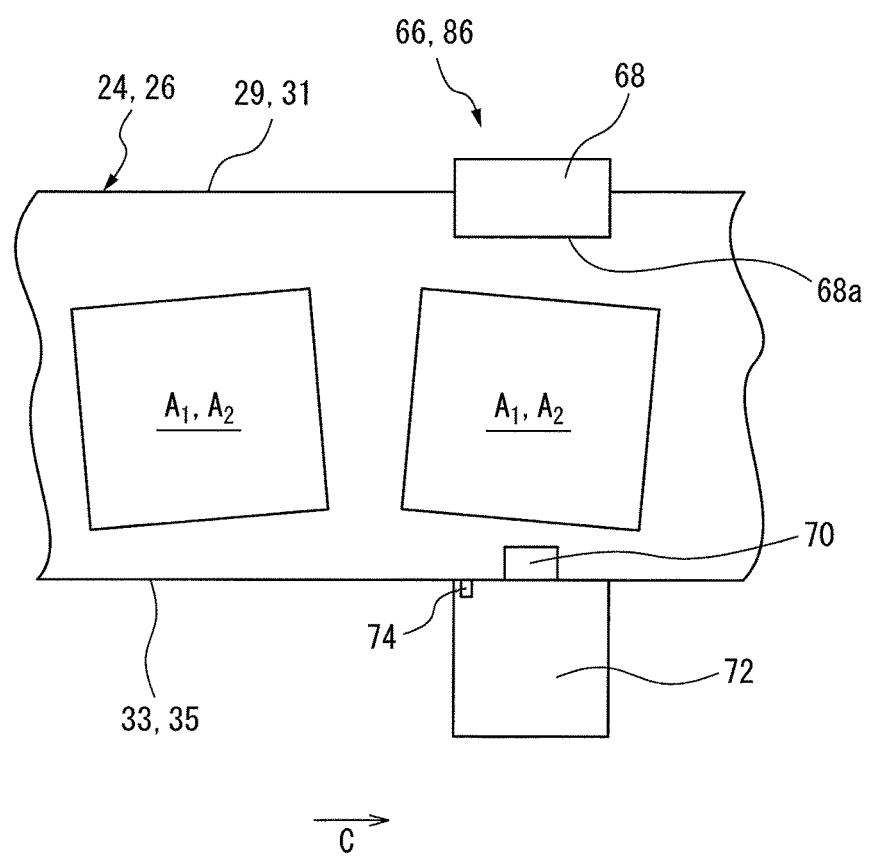
FIG. 5 is an enlarged view of the positioning section shown in FIG. 3.

Specifically, as shown in FIG. 5, the positioning section 66 includes a positioning wall 68, a positioning shaft 70, a driving section 72, and a proximity sensor 74. The positioning wall 68 is secured to one side 29 of the first buffer conveyor 24, and has an abutting surface 68a. The abutting surface 68a is a plane substantially parallel to the conveyance direction C.

The positioning shaft 70 is arranged to oppose to the positioning wall 68, and provided at the other side 33 of the first buffer conveyor 24 so as to be movable in directions toward and away from the positioning wall 68.

The proximity sensor 74 detects that the article $A_1$, conveyed by the first buffer conveyor 24 passes the vicinity of the proximity sensor 74, and transmits a trigger signal to the buffer conveyor controller 28.

The driving section 72 is secured to the side 33 of the first buffer conveyor 24, and moves the positioning shaft 70 toward and away from the positioning wall 68, in response to a command from the buffer conveyor controller 28. In an example, the driving section 72 is a hydraulic or pneumatic cylinder.

Specifically, when the buffer conveyor controller 28 receives the trigger signal from the proximity sensor 74, it transmits a command to the driving section 72 so as to move the positioning shaft 70 toward the positioning wall 68.

Figure 6:
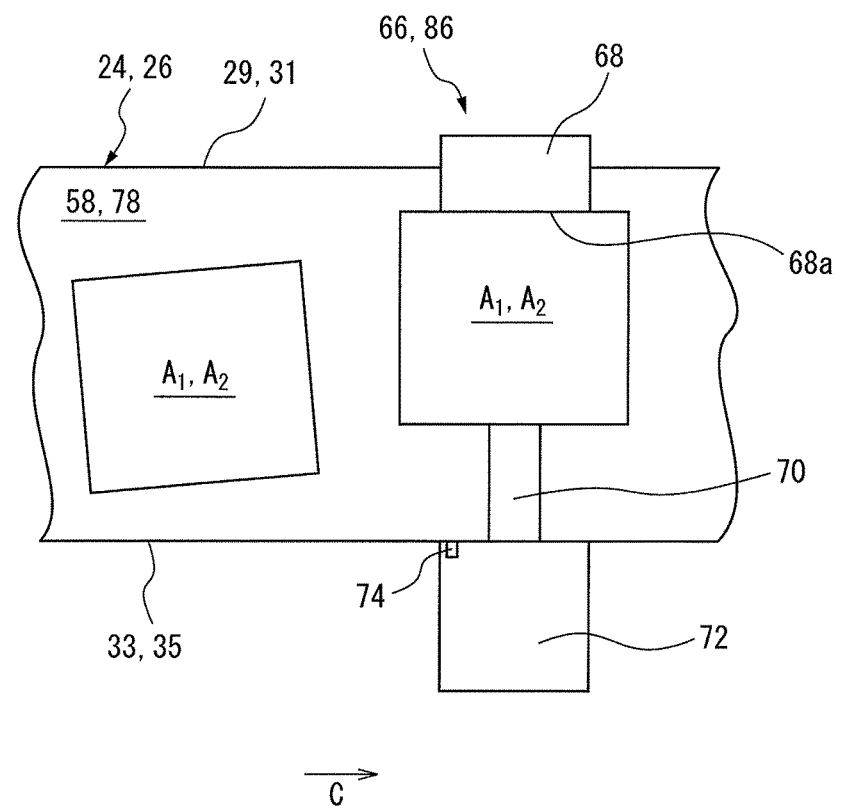
FIG. 6 is a view for explaining a function of the positioning section shown in FIG. 5.

Consequently, the positioning shaft 70 is moved from the initial position shown in FIG. 5 to the advance position shown in FIG. 6. At this time, the article $A_1$ passing the vicinity of the proximity sensor 74 is pushed by the positioning shaft 70 so as to be abutted against the abutting surface 68a of the positioning wall 68.

As a result, the article $A_1$ abutted against the abutting surface 68a is positioned at the position and posture shown in FIG. 6. Then, the buffer conveyor controller 28 transmits a command to the driving section 72 so as to move the positioning shaft 70 away from the positioning wall 68. Consequently, the positioning shaft 70 returns to the initial position shown in FIG. 5.

Thus, in this embodiment, the position and posture of the article $A_1$ conveyed by the first buffer conveyor 24 can be uniformed by the action of the positioning section 66.

The anti-drop wall 67 is provided at the downstream end of the first buffer conveyor 24, and contacts the article $A_1$ conveyed to the downstream end of the first buffer conveyor 24, thereby prevents the article $A_1$ from moving further forward from the downstream end of the first buffer conveyor 24 in the conveyance direction C. Due to this, the article $A_1$ is prevented from dropping from the first buffer conveyor 24.

The second buffer conveyor 26 is disposed vertically upward of the first buffer conveyor 24, and provided subsequent to the supply conveyor 14 so as to convey the second type of article $A_2$. Specifically, the second buffer conveyor 26 includes a support frame 76, a movable section 78 movably provided at the support frame 76, and a driving section 80 (FIG. 2) configured to generate power for moving the movable section 78.

The support frame 76 includes a plurality of legs 82 and support 84 secured to the top ends of the legs 82. Each leg 82 is fixed on the support 64 of the first buffer conveyor 24 at the bottom end of the leg 82, and vertically extends from the support 64. Each leg 82 is secured to the support 64 of the first buffer conveyor 24 by e.g. a fastening tool such as bolts, or welding. The support 84 supports the movable section 78 so as to be movable.

The second type of article $A_2$ is placed on the movable section 78 by the sorting robot 20. The driving section 80 includes e.g. a servomotor, and moves the movable section 78 in response to a command from the buffer conveyor controller 28, thereby conveys the article $A_2$ placed on the movable section 78 in the conveyance direction C the same as the first buffer conveyor 24.

The second buffer conveyor 26 further includes a positioning section 86 and an anti-drop wall 88. The positioning section 86 is configured to position the article $A_2$ placed on the movable section 78 of the second buffer conveyor 26 at a predetermined position and posture.

The positioning section 86 has a configuration the same as the positioning section 66. Specifically, as shown in FIGS. 5 and 6, the positioning section 86 includes the positioning wall 68, the positioning shaft 70, the driving section 72, and the proximity sensor 74.

The positioning wall 68 of the positioning section 86 is provided at one side 31 of the second buffer conveyor 26, while the driving section 72 of the positioning section 86 is provided at the other side 35 of the second buffer conveyor 26.

With a control method similar as the positioning section 66, the buffer conveyor controller 28 controls the driving section 72 of the positioning section 86 in response to a trigger signal from the proximity sensor 74 of the positioning section 86 so as to move the positioning shaft 70 toward and away from the positioning wall 68. By the action of the positioning section 86, the position and posture of the article $A_2$ conveyed by the second buffer conveyor 26 can be uniformed.

The anti-drop wall 88 is provided at the downstream end of the second buffer conveyor 26, and contacts the article $A_2$ conveyed to the downstream end of the second buffer conveyor 26, thereby prevents the article $A_2$ from moving further forward from the downstream end of the second buffer conveyor 26 in the conveyance direction C. Due to this, the article $A_2$ is prevented from dropping from the second buffer conveyor 26.

The support frame 56 of the first buffer conveyor 24 has a load bearing ability more excellent than that of the support frame 76 of the second buffer conveyor 26. As an example, the support frame 56 is made of a first material, while the support frame 76 is made of a second material, wherein the first material has a strength (e.g., a tensile strength or a shear strength) higher than that of the second material.

As another example, if the support frames 56 and 76 are made of the same material, the leg 62 (or support 64) of the support frame 56 has a cross-sectional areas larger than (i.e., is thicker than) that of the leg 82 (or support 84) of the support frame 76.

As shown in FIG. 4, the length D of the first buffer conveyor 24 in the conveyance direction C is larger than the length E of the second buffer conveyor 26 in the conveyance direction C. Further, the downstream end of the first buffer conveyor 24 is spaced in the conveyance direction C away from the downstream end of the second buffer conveyor 26 by a distance F.

In addition, the upstream end of the second buffer conveyor 26 is spaced in the conveyance direction C away from the upstream end of the second buffer conveyor 24 by a distance G. In this respect, the distances G and F are larger than the longitudinal length of the article $A_1$ placed on the first buffer conveyor 24 when the article $A_1$ is viewed from vertically upward. Further, the distances G and F may be the same as each other.

Referring again to FIGS. 1 and 2, the buffer conveyor controller 28 includes a CPU and a memory (not shown), etc., and controls each component (the driving sections 60, 72, and 80) of the first buffer conveyor 24 and the second buffer conveyor 26.

The first article detection sensor 30 includes e.g. a proximity sensor, and is disposed at the vicinity of the upstream ends of the first buffer conveyor 24 and the second buffer conveyor 26. The first article detection sensor 30 detects whether the article $A_1$ is placed on the upstream end of the first buffer conveyor 24, and transmits a first article placement signal to the system controller 12 when detecting the placement of the article $A_1$.

Similarly, the first article detection sensor 30 detects whether the article $A_2$ is placed on the upstream end of the second buffer conveyor 26, and transmits a second article placement signal to the system controller 12 when detecting the placement of the article $A_2$.

The second article detection sensor 32 includes e.g. a proximity sensor, and is disposed at the vicinity of the downstream ends of the first buffer conveyor 24 and the second buffer conveyor 26. The second article detection sensor 32 detects whether the article $A_1$ arrives at the downstream end of the first buffer conveyor 24, and transmits a first article arrival signal to the system controller 12 when detecting the arrival of the article $A_1$.

Similarly, the second article detection sensor 32 detects whether the article $A_2$ arrives at the downstream end of the second buffer conveyor 26, and transmits a second article arrival signal to the system controller 12 when detecting the arrival of the article $A_2$.

The loading robot 34 is arranged adjacent to the downstream end of the first buffer conveyor 24. The loading robot 34 has a configuration similar to that of the sorting robot 20. Specifically, the loading robot 34 includes the robot base 42, the revolving drum 44, the robot arm 46, the wrist 48, and the end effector 50.

The loading robot controller 36 has a CPU and a memory (not shown), etc., and transmits commands to the servomotors 49 (FIG. 2) built in the revolving drum 44, the robot arm 46, and the wrist 48 of the loading robot 34, so as to dispose the end effector 50 of the loading robot 34 at a given position and posture. Further, the loading robot controller 36 transmits a command to the end effector 50 of the loading robot 34 so as to activate the suction sections 50a.

Figure 7:
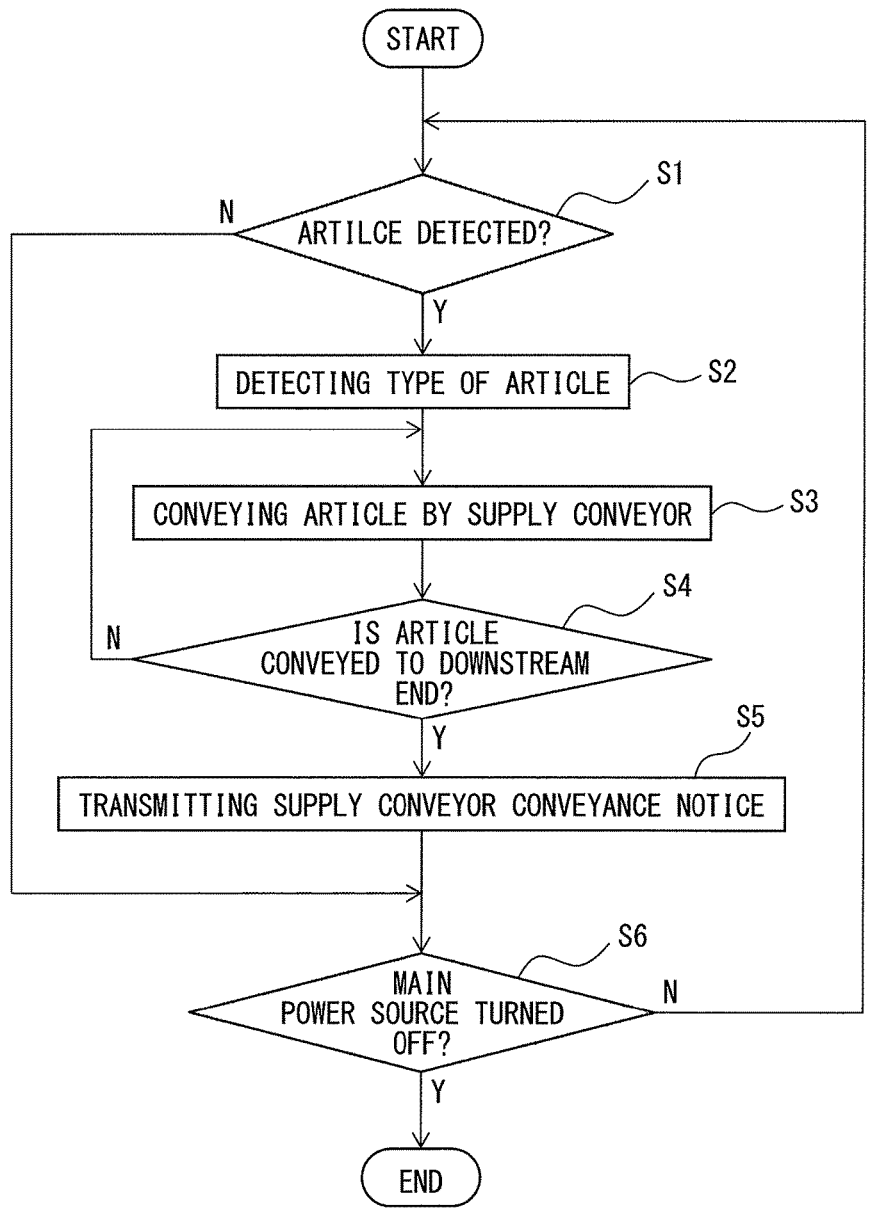
FIG. 7 is a flowchart showing an example of a control scheme for the supply conveyor.
Figure 8:
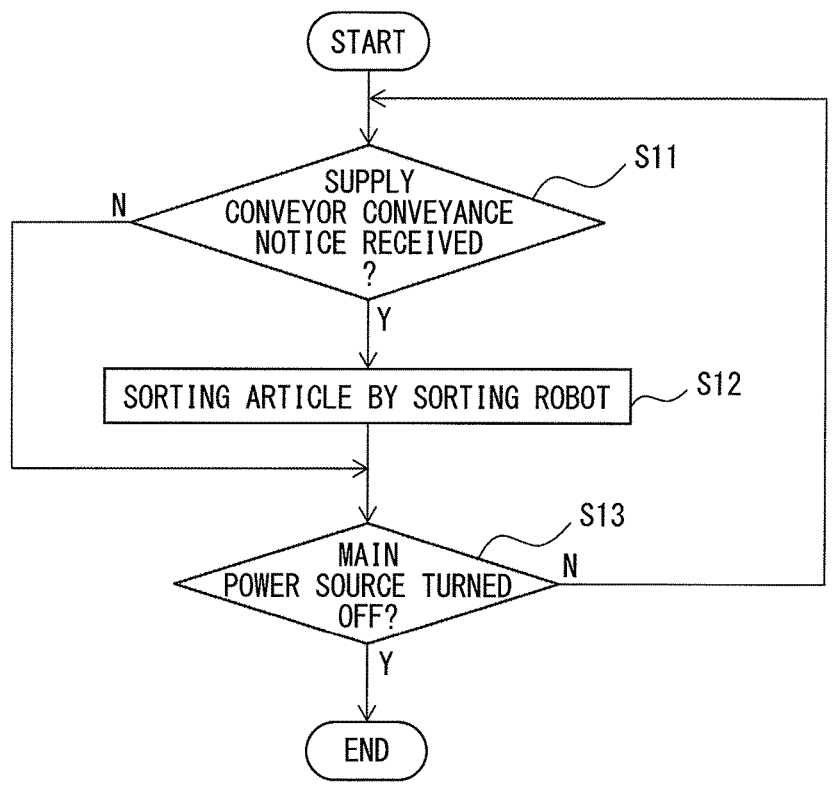
FIG. 8 is a flowchart showing an example of a control scheme for the sorting robot.

Next, with reference to FIGS. 7 to 10, the operation of the palletizing system 10 will be described. FIG. 7 is a flowchart showing an example of the control scheme of the supply conveyor 14. FIG. 8 is a flowchart showing an example of the control scheme of the sorting robot 20.

Figure 9:
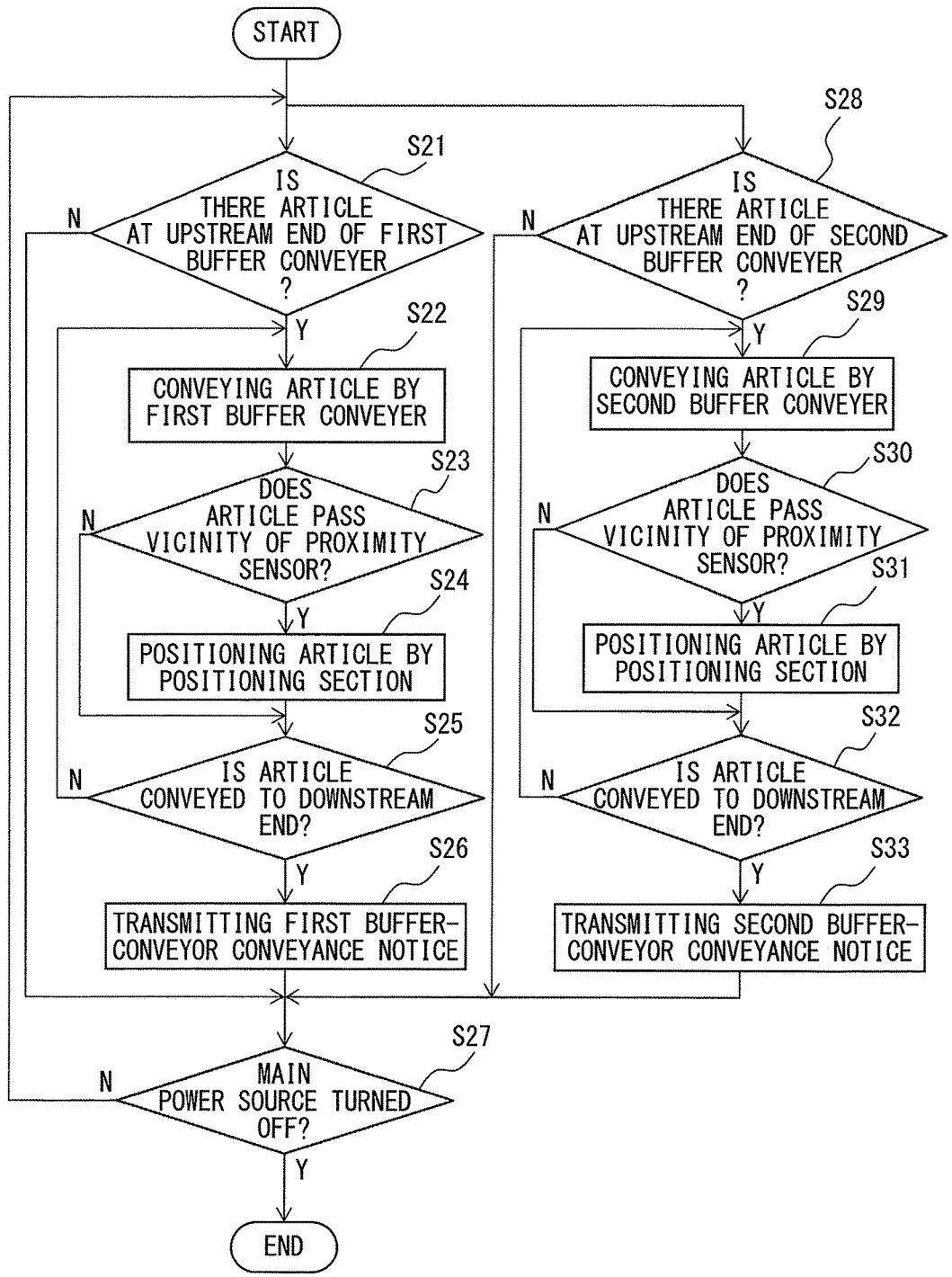
FIG. 9 is a flowchart showing an example of a control scheme for the first buffer conveyor and second buffer conveyor.
Figure 10:
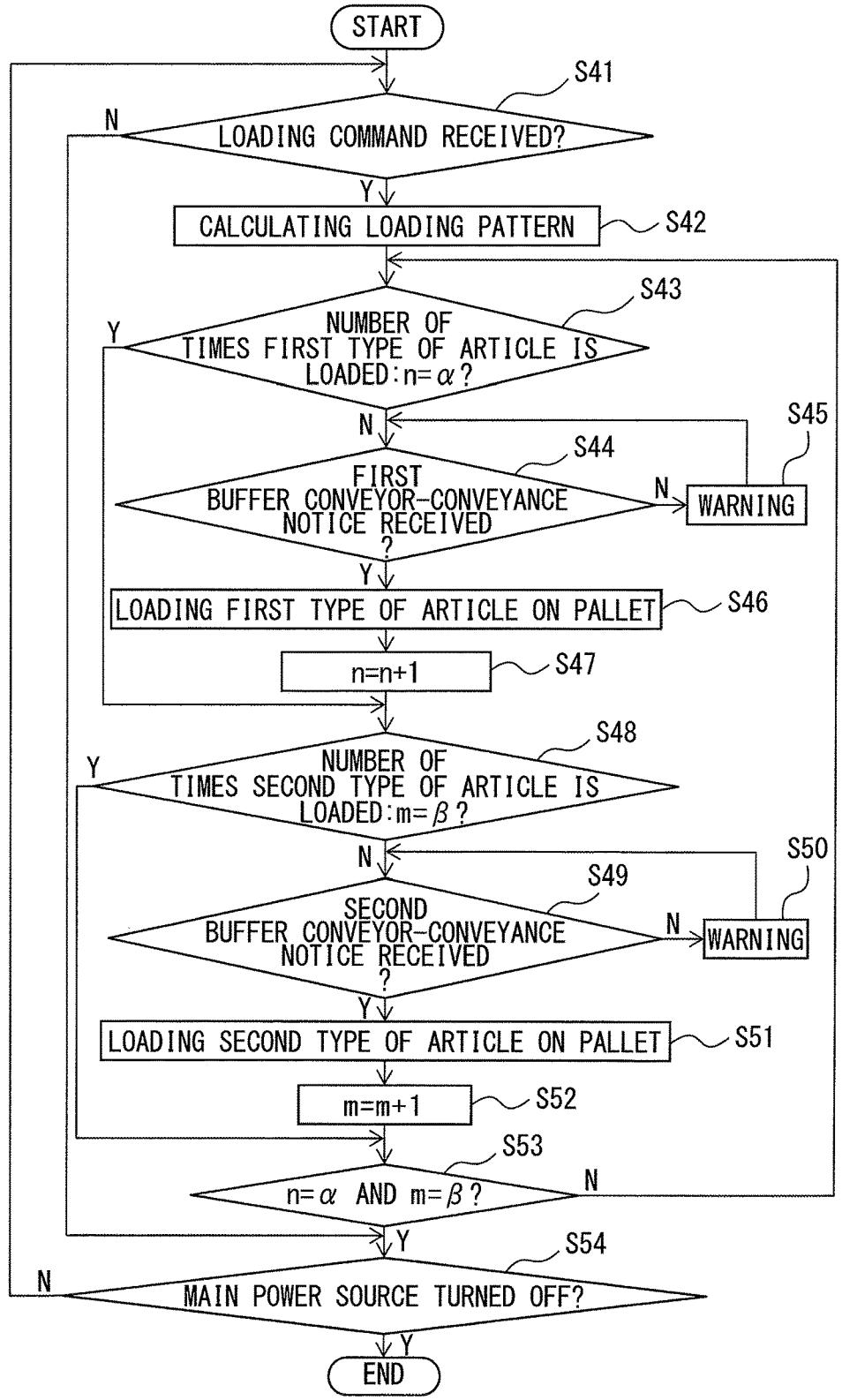
FIG. 10 is a flowchart showing an example of a control scheme for the loading robot.

FIG. 9 is a flowchart showing an example of the control scheme of the first buffer conveyor 24 and the second buffer conveyor 26. FIG. 10 is a flowchart showing an example of the control scheme of the loading robot 34.

The system controller 12 comprehensively controls the operation of each component (the supply conveyor controller 16, the type detection sensor 18, the sorting robot controller 22, the buffer conveyor controller 28, the first article detection sensor 30, the second article detection sensor 32, the loading robot controller 36) of the palletizing system 10, and carries out the processes shown in FIGS. 7 to 10 concurrently.

The flow shown in FIG. 7 is started when the main power source of the palletizing system 10 is turned on. At step S1, the type detection sensor 18 detects whether the article $A_1$ or $A_2$ is placed on the upstream end of the supply conveyor 14.

Specifically, the type detection sensor 18 images the upstream end of the supply conveyor 14, and detects whether the article $A_1$ or $A_2$ exists on the upstream end from the image.

The process shifts to step S2 when the type detection sensor 18 determines that the article $A_1$ or $A_2$ exists on the upstream end of the supply conveyor 14 (i.e., YES). On the other hand, the process shifts to step S6 when the type detection sensor 18 determines that the article $A_1$ or $A_2$ does not exist on the upstream end of the supply conveyor 14 (i.e., NO).

At step S2, the type detection sensor 18 detects the type of the article $A_1$ or $A_2$ imaged at step S1. Specifically, the type detection sensor 18 calculates the dimension of the imaged article $A_1$ or $A_2$ at step S1, as described above.

Then the type detection sensor 18 checks the dimension of the imaged article $A_1$ or $A_2$ against the pre-stored data table representing the relationship between the types and dimensions of the articles, so as to specify whether the imaged article is the first type of article $A_1$ or the second type of article $A_2$.

Further, the type detection sensor 18 calculates the position and posture of the imaged article $A_1$ or $A_2$. The type detection sensor 18 transmits information on the specified type of the article $A_1$ or $A_2$ and on its position and posture to the system controller 12.

At step S3, the supply conveyor controller 16 transmits a command to the driving section 40 of the supply conveyor 14 so as to move the movable part 38 to convey the article $A_1$ or $A_2$ imaged at step S1 in the conveyance direction B.

At step S4, the supply conveyor controller 16 determines whether the article $A_1$ or $A_2$ imaged at step S1 is conveyed to the downstream end of the supply conveyor 14. As an example, when the driving section 40 has a servomotor, the supply conveyor controller 16 determines whether the article $A_1$ or $A_2$ imaged at step S1 is conveyed to the downstream end of the supply conveyor 14, from the number of rotations of the servomotor.

In this case, the memory of the supply conveyor controller 16 pre-stores a data table representing the relationship between the number of rotations of the servomotor and the conveyance distance in the supply conveyor 14. Then, the supply conveyor controller 16 checks the data table against the number of rotations by which the servomotor is rotated at step S3, so as to determine whether the article $A_1$ or $A_2$ is conveyed by a distance between the position of the article at the start of step S3 and the position of the downstream end of the supply conveyor 14.

As another example, the supply conveyor 14 may further includes a third article detection sensor (e.g., a proximity sensor), and determine whether the article $A_1$ or $A_2$ is conveyed to the downstream end of the supply conveyor 14 by the third article detection sensor.

The process shifts to step S5 when the supply conveyor controller 16 determines that the article $A_1$ or $A_2$ is conveyed to the downstream end of the supply conveyor 14 (i.e., YES). On the other hand, the process returns to step S3 when the supply conveyor controller 16 determines that the article $A_1$ or $A_2$ is not conveyed to the downstream end of the supply conveyor 14 (i.e., NO).

At step S5, the supply conveyor controller 16 transmits a supply conveyor conveyance notice to the system controller 12. The supply conveyor conveyance notice indicates that the article $A_1$ or $A_2$, the type of which has been specified at step S2, arrives at the downstream end of the supply conveyor 14.

When the system controller 12 receives the supply conveyor conveyance notice from the supply conveyor controller 16, the system controller 12 transmits to the sorting robot controller 22 the supply conveyor conveyance notice, the information on the type of the article $A_1$ or $A_2$ and on the position and posture of the article, which have been received from the supply conveyor controller 16 at step S2.

At step S6, the system controller 12 determines whether the main power source of the palletizing system 10 is turned off. The system controller 12 ends the process shown in FIG. 7 when determining that the main power source of the palletizing system 10 is turned off (i.e., YES). On the other hand, the system controller 12 returns the process to step S1 when the main power source of the palletizing system 10 is still turned on (i.e., NO).

The flow shown in FIG. 8 is started when the main power source of the palletizing system 10 is turned on. At step S11, the sorting robot controller 22 determines whether it has received the supply conveyor conveyance notice from the system controller 12.

The process shifts to step S12 when the sorting robot controller 22 determines that it has received the supply conveyor conveyance notice from the system controller 12 (i.e., YES). On the other hand, the process shifts to step S13 when the sorting robot controller 22 determines that it has not received the supply conveyor conveyance notice (i.e., NO).

At step S12, the sorting robot controller 22 operates the sorting robot 20 so as to sort the article $A_1$ or $A_2$ conveyed to the downstream end of the supply conveyor 14 to place it on the first buffer conveyor 24 or the second buffer conveyor 26.

As described above, the system controller 12 transmits to the sorting robot controller 22 the information on the type of the article $A_1$ or $A_2$ specified at step S2 and on the position and posture thereof, together with the supply conveyor conveyance notice.

For example, when the first type of article $A_1$ is specified at step S2, at thus step S12, the sorting robot controller 22 operates the sorting robot 20 based on the position and posture calculated at step S2, so that the end effector 50 is disposed vertically upward of the article $A_1$ positioned at the downstream end of the supply conveyor 14.

At this time, the end effector 50 is positioned with respect to the article $A_1$ so that the longitudinal direction of the end effector 50 coincides with the longitudinal direction (or the lateral direction) of the article $A_1$ when the article $A_1$ is viewed from upward, and that the bottom faces of the suction sections 50a of the end effector 50 are adjacent to (or contact) the top face of the article $A_1$.

Then, the sorting robot controller 22 activates the suction sections 50a of the end effector 50 so that the suction sections 50a suctions and holds the article $A_1$. Then, the sorting robot controller 22 operates the sorting robot 20 in accordance with the robot program pre-stored in the memory of the sorting robot controller 22, so as to dispose the article $A_1$ above the upstream end of the second buffer conveyor 24.

Note that, the robot program may be constructed e.g. by teaching the sorting robot 20 the operation of moving the article $A_1$ from the downstream end of the supply conveyor 14 to the upstream end of the second buffer conveyor 24.

Then, the sorting robot controller 22 deactivates the suction sections 50a so as to release the article $A_1$ from the suction sections 50a. Thus, the article $A_1$ is placed on the upstream end of the second buffer conveyor 24.

On the other hand, when the second type of article $A_2$ is specified at step S2, at this step S12, the sorting robot controller 22 causes the suction sections 50a of the end effector 50 to suction and hold the second type of article $A_2$ placed at the downstream end of the supply conveyor 14, similarly as the case where the first type of article $A_1$ is placed on the first buffer conveyor 24.

Then, the sorting robot controller 22 operates the sorting robot 20 in accordance with the robot program so as to dispose the held article $A_2$ above the upstream end of the second buffer conveyor 26. Then, the sorting robot controller 22 deactivates the suction sections 50a so as to release the article $A_2$ from the suction sections 50a. Thus, the article $A_2$ is placed on the upstream end of the second buffer conveyor 26.

In this way, the sorting robot 20 sorts the articles $A_1$ and $A_2$ conveyed to the downstream end of the supply conveyor 14 so that the first type of article $A_1$ is placed on the first buffer conveyor 24 while the second type of article $A_2$ is placed on the second buffer conveyor 26.

At step S13, the system controller 12 determines whether the main power source of the palletizing system 10 is turned off, similarly as the above-mentioned step S6. The system controller 12 ends the process shown in FIG. 8 when it determines YES. On the other hand, the system controller 12 returns the process to step S11 when it determines NO.

The flow shown in FIG. 9 is started when the main power source of the palletizing system 10 is turned on. At step S21, the first article detection sensor 30 detects whether the first type of article $A_1$ is placed on the upstream end of the second buffer conveyor 24.

When the first article detection sensor 30 detects the placement of the first type of article $A_1$ (i.e., YES), the buffer conveyor controller 28 shifts the process to step S22. On the other hand, when the first article detection sensor 30 does not detect the placement of the first type of article $A_1$ (i.e., NO), the buffer conveyor controller 28 shifts the process to step S27.

At step S22, the buffer conveyor controller 28 transmits a command to the driving section 60 of the first buffer conveyor 24 so as to move the movable section 58 to convey the article $A_1$ in the conveyance direction C.

At step S23, the buffer conveyor controller 28 determines whether the article $A_1$ conveyed by the first buffer conveyor 24 passes the vicinity of the proximity sensor 74 of the positioning section 66. Specifically, the buffer conveyor controller 28 determines whether it receives the trigger signal from the proximity sensor 74 of the positioning section 66.

The buffer conveyor controller 28 determines YES when it receives the trigger signal, and shifts the process to step S24. On the other hand, the buffer conveyor controller 28 determines NO when it does not receive the trigger signal, and shifts the process to step S25.

At step S24, the buffer conveyor controller 28 transmits a command to the driving section 72 of the positioning section 66 so as to move the positioning shaft 70 to the advance position shown in FIG. 6. Due to this, the article $A_1$ passing the vicinity of the proximity sensor 74 of the positioning section 66 is positioned at the position and posture shown in FIG. 6.

At step S25, the buffer conveyor controller 28 determines whether the article $A_1$ is conveyed to the downstream end of the first buffer conveyor 24. Specifically, the buffer conveyor controller 28 determines whether it receives the first article arrival signal from the second article detection sensor 32.

The buffer conveyor controller 28 shifts the process to step S26 when it determines that it receives the first article arriving signal (i.e., YES). On the other hand, the buffer conveyor controller 28 returns the process to step S22 when it determines that it does not receive the first article arriving signal (i.e., NO).

At step S26, the buffer conveyor controller 28 transmits a first buffer conveyor conveyance notice to the system controller 12. The first buffer conveyor conveyance notice indicates the arrival of the article $A_1$ conveyed at step S22 at the downstream end of the first buffer conveyor 24.

The system controller 12 transmits the first buffer conveyor conveyance notice to the loading robot controller 36 when it receives the first buffer conveyor conveyance notice from the buffer conveyor controller 28.

At step S27, the system controller 12 determines whether the main power source of the palletizing system 10 is turned off, as in the above-mentioned step S6. The system controller 12 ends the flow shown in FIG. 9 when it determines YES. On the other hand, the system controller 12 returns the process to steps 21 and 28 when it determines NO.

The buffer conveyor controller 28 carries out steps 28 to 33, concurrently with steps 21 to 26.

At step S28, the second article detection sensor 32 detects whether the second type of article $A_2$ is placed on the upstream end of the second buffer conveyor 26.

When the second article detection sensor 32 detects the placement of the second type of article $A_2$ (i.e., YES), the buffer conveyor controller 28 shifts the process to step S29. On the other hand, when the second article detection sensor 32 does not detect the placement of the second type of article $A_2$ (i.e., NO), the buffer conveyor controller 28 shifts the process to step S27.

At step S29, the buffer conveyor controller 28 transmits a command to the driving section 80 of the second buffer conveyor 26 so as to move the movable section 78 to convey the article $A_2$ in the conveyance direction C.

At step S30, the buffer conveyor controller 28 determines whether the article $A_2$ conveyed by the second buffer conveyor 26 passes the vicinity of the proximity sensor 74 of the positioning section 86. Specifically, the buffer conveyor controller 28 determines whether it receives the trigger signal from the proximity sensor 74 of the positioning section 86.

The buffer conveyor controller 28 determines YES when it receives the trigger signal, and shifts the process to step S31. On the other hand, the buffer conveyor controller 28 determines NO when it does not receives the trigger signal, and shifts the process to step S32.

At step S31, the buffer conveyor controller 28 transmits a command to the driving section 72 of the positioning section 86 so as to move the positioning shaft 70 to the advance position shown in FIG. 6. Due to this, the article $A_2$ passing the vicinity of the proximity sensor 74 of the positioning section 86 is positioned at the position and posture shown in FIG. 6.

At step S32, the buffer conveyor controller 28 determines whether the article $A_2$ is conveyed to the downstream end of the second buffer conveyor 26. Specifically, the buffer conveyor controller 28 determines whether it has received a second article arriving signal from the second article detection sensor 32.

The buffer conveyor controller 28 shifts the process to step S33 when determining that it has received the second article arriving signal (i.e., YES). On the other hand, the buffer conveyor controller 28 returns the process to step S29 when determining that it has not received the second article arriving signal (i.e., NO).

At step S33, the buffer conveyor controller 28 transmits a second buffer conveyor conveyance notice to the system controller 12. The second buffer conveyor conveyance notice indicates the arrival of the article $A_2$ conveyed at step S29 at the downstream end of the second buffer conveyor 26.

The system controller 12 transmits the second buffer conveyor conveyance notice to the loading robot controller 36 when it receives the second buffer conveyor conveyance notice from the buffer conveyor controller 28.

The flow shown in FIG. 10 is started when the main power source of the palletizing system 10 is turned on. At step S41, the system controller 12 determines whether it receives a loading command from an operator or a production management device (not shown).

The loading command includes information on the number of articles $A_1$ and $A_2$ to be loaded on the pallet B. The system controller 12 receives the loading command from the operator via an input device, such as a keyboard, or from the production management device communicably connected to the system controller 12.

The system controller 12 shifts the process to step S42 when it determines that it receives the loading command (i.e., YES). On the other hand, the system controller 12 shifts the process to step S54 when it determines that it does not receive the loading command (i.e., NO).

At step S42, the loading robot controller 36 calculates a loading pattern. The loading pattern is a robot program for determining the loading position of the first type of article $A_1$ and the second type of article $A_2$ on the pallet B when the articles $A_1$ and $A_2$ are loaded on the pallet B.

On the other hand, the memory of the loading robot controller 36 pre-stores a software program for calculating the loading pattern. The loading robot controller 36 applies the information on the number of the articles $A_1$ and $A_2$ to be loaded on the pallet B, which is included in the loading command, to the software program, and calculates the loading pattern.

At step S43, the loading robot controller 36 determines whether the number "n" of times the first type of article $A_1$ is loaded on the pallet B satisfies n=α. The "α" is the number of articles $A_1$ to be loaded on the pallet B, which is included in the loading command.

The loading robot controller 36 shifts the process to step S48 when it determines that n=α is satisfied (i.e., YES). On the other hand, the loading robot controller 36 shifts the process to step S44 when it determines that n<α is satisfied (i.e., NO).

At step S44, the loading robot controller 36 determines whether it receives the first buffer conveyor conveyance notice from the system controller 12. The loading robot controller 36 shifts the process to step S46 when it determines that it receives the first buffer conveyor conveyance notice from the system controller 12 (i.e., YES).

On the other hand, the loading robot controller 36 shifts the process to step S45 when it determines that it does not receives the first buffer conveyor conveyance notice from the system controller 12 (i.e., NO).

At step S45, the system controller 12 notifies the operator of a warning. Specifically, the loading robot controller 36 transmits a first warning trigger signal to the system controller 12. The system controller 12 generates a first warning when is receives the first warning trigger signal.

The first warning is generated e.g. in the form of an image signal or an audio signal indicating that "no article arrives at the downstream end of the first buffer conveyor". The system controller 12 outputs the first warning in the form of image or sound to the operator via a display or speaker (both are not shown) provided in the palletizing system 10. Then, the system controller 12 returns the process to step S44.

At step S46, the loading robot controller 36 operates the loading robot 34 so as to load the first type of article $A_1$ on the pallet B. Specifically, the loading robot controller 36 operates the loading robot 34 in accordance with the robot program so that the end effector 50 of the loading robot 34 is disposed vertically upward of the article $A_1$ positioned at the downstream end of the first buffer conveyor 24.

As described above, the position and posture of the article $A_1$ placed at the downstream end of the first buffer conveyor 24 is uniformed by the action of the positioning section 66 to the position and posture shown in FIG. 6. Accordingly, the loading robot controller 36 can appropriately position the end effector 50 of the loading robot 34 at vertically upward of the article $A_1$ in accordance with a robot program, without using a vision sensor.

The robot program is constructed e.g. by teaching the loading robot 34 the operation of disposing the end effector 50 at vertically upward of the article $A_1$ placed at the downstream end of the first buffer conveyor 24.

When the end effector 50 of the loading robot 34 is disposed upward of the article $A_1$, the longitudinal direction of the end effector 50 coincides with the longitudinal direction (or the lateral direction) of the article $A_1$ when the article $A_1$ is viewed from above, and the bottom faces of the suction sections 50a of the end effector 50 are adjacent to (or contact) the top face of the article $A_1$.

Then, the loading robot controller 36 activates the suction sections 50a of the end effector 50 of the loading robot 34 so that the suction sections 50a suction and hold the article $A_1$. Then, the loading robot controller 36 operates the loading robot 34 in accordance with the loading pattern calculated at step S42 so as to dispose the held article $A_1$ at a position on the pallet B determined by the loading pattern.

Then, the loading robot controller 36 deactivates the suction sections 50a so as to release the article $A_1$ from the suction sections 50a. Thus, the article $A_1$ is loaded at the position on the pallet B determined by the loading pattern.

At step S47, the loading robot controller 36 increments the number "n" of times the first type of article $A_1$ is loaded on the pallet B by "1" (i.e., n=n+1).

At step S48, the loading robot controller 36 determines whether the number "m" of times the second type of article $A_2$ is loaded on the pallet B satisfies m=β. The "β" is the number of articles $A_2$ to be loaded on the pallet B, which is included in the loading command.

The loading robot controller 36 shifts the process to step S53 when it determines that m=β is satisfied (i.e., YES). On the other hand, the loading robot controller 36 shifts the process to step S49 when it determines that m<β is satisfied (i.e., NO).

At step S49, the loading robot controller 36 determines whether it receives the second buffer conveyor conveyance notice from the system controller 12.

The loading robot controller 36 shifts the process to step S51 when is determines that it receives the second buffer conveyor conveyance notice (i.e., YES). On the other hand, the loading robot controller 36 shifts the process to step S50 when it determines that it does not receive the second buffer conveyor conveyance notice (i.e., NO).

At step S50, the system controller 12 notifies the operator of a warning. Specifically, the loading robot controller 36 transmits a second warning trigger signal to the system controller 12. The system controller 12 generates a second warning when it receives the second warning trigger signal.

The second warning is generated e.g. in the form of an image signal or an audio signal indicating that "no article arrives at the downstream end of the second buffer conveyor". The system controller 12 outputs the second warning in the form of image or sound to the operator via the display or speaker (both are not shown) provided in the palletizing system 10. Then, the system controller 12 returns the process to step S49.

At step S51, the loading robot controller 36 operates the loading robot 34 so as to load the second type of article $A_2$ on the pallet B. Specifically, the loading robot controller 36 operates the loading robot 34 in accordance with the robot program so that the end effector 50 of the loading robot 34 is disposed above the article $A_2$ placed at the downstream end of the second buffer conveyor 26.

As described above, the position and posture of the article $A_2$ placed at the downstream end of the second buffer conveyor 26 is uniformed by the action of the positioning section 86 to the position and posture shown in FIG. 6. Accordingly, the loading robot controller 36 can appropriately position the end effector 50 of the loading robot 34 at upward of the article $A_2$ in accordance with the robot program, without using a vision sensor.

When the end effector 50 of the loading robot 34 is disposed above the article $A_2$, the longitudinal direction of the end effector 50 coincides with the longitudinal direction (or the lateral direction) of the article $A_2$ when the article $A_2$ is viewed from above, and the bottom faces of the suction sections 50a of the end effector 50 are adjacent to (or contact) the top face of the article $A_2$.

Then, the loading robot controller 36 activates the suction sections 50a of the end effector 50 of the loading robot 34 so that the suction sections 50a suction and hold the article $A_2$. Then, the loading robot controller 36 operates the loading robot 34 in accordance with the loading pattern calculated at step S42 so as to dispose the held article $A_2$ at a position on the pallet B, which is determined by the loading pattern.

Then, the loading robot controller 36 deactivates the suction sections 50a to release the article $A_2$ from the suction sections 50a. Thus, the article $A_2$ is loaded at the position on the pallet B determined by the loading pattern.

At step S52, the loading robot controller 36 increments the number "m" of times the second type of article $A_2$ is loaded on the pallet B by "1" (i.e., m=m+1).

At step S53, the loading robot controller 36 determines whether n=α and m=β are satisfied. The loading robot controller 36 shifts the process to step S54 when it determines that n=α and m=β are satisfied (i.e., YES). On the other hand, the loading robot controller 36 shifts the process to step S43 when it determines that n<α or m<β is satisfied (i.e., NO).

At step S54, the system controller 12 determines whether the main power source of the palletizing system 10 is turned off, as in the above-mentioned step S6. The system controller 12 ends the flow shown in FIG. 10 when it determines YES. On the other hand, the system controller 12 returns the process to step S41 when it determines NO.

As described above, in this embodiment, the second buffer conveyor 26 on which the second type of article $A_2$ is placed is disposed vertically upward of the first buffer conveyor 24 on which the first type of article $A_1$ is placed.

By thus placing the buffer conveyor 24 and 26 so that the buffer conveyor 26 is arranged to be stacked on buffer conveyor 24 in the vertical direction, it is possible to effectively make use of the vertical space in a factory, and thereby, reduce the horizontal space occupied by the buffer conveyors 24 and 26.

Further, in this embodiment, the length D of the first buffer conveyor 24 is larger than the length E of the second buffer conveyor 26, and the upstream end of the second buffer conveyor 26 is spaced in the conveyance direction C from the upstream end of the second buffer conveyor 24.

According to this configuration, the possibility that a component (e.g., end effector 50) of the sorting robot 20 or the article $A_1$ may interfere with a component (e.g., leg 82) of the second buffer conveyor 26 when the sorting robot 20 places the article $A_1$ on the upstream end of the second buffer conveyor 24 at step S12 can be reduced.

Further, in this embodiment, the downstream end of the first buffer conveyor 24 is spaced in the conveyance direction C from the downstream end of the second buffer conveyor 26.

According to this configuration, the possibility that a component (e.g., end effector 50) of the loading robot 34 or the article $A_1$ may interfere with a component (e.g., leg 82) of the second buffer conveyor 26 when the loading robot 34 picks up the article $A_1$ from the downstream end of the first buffer conveyor 24 at step S46 can be reduced.

Further, in this embodiment, the support frame 56 of the first buffer conveyor 24 has a load bearing ability better than that of the support frame 76 of the second buffer conveyor 26. According to this embodiment, the possibility that the first buffer conveyor 24 may be broken by a load can be reduced, and thus, it is possible to extend the life of the palletizing system 10.

Further, in this embodiment, the first type of article $A_1$ placed on the first buffer conveyor 24 has a dimension larger than that of the second type of article $A_2$.

The fact that the dimension of the article $A_1$ is larger than that of the article $A_2$ provides the following advantages.

Specifically, since the second buffer conveyor 26 is shorter than the first buffer conveyor 24, it is possible to increase the number of articles $A_2$ that can be placed on the second buffer conveyor 26 when the article $A_2$ has a smaller dimension.

Note that, in the above embodiment, the palletizing system 10 including two conveyors 24 and 26. However, the palletizing system may include three or more buffer conveyors.

Figure 11:
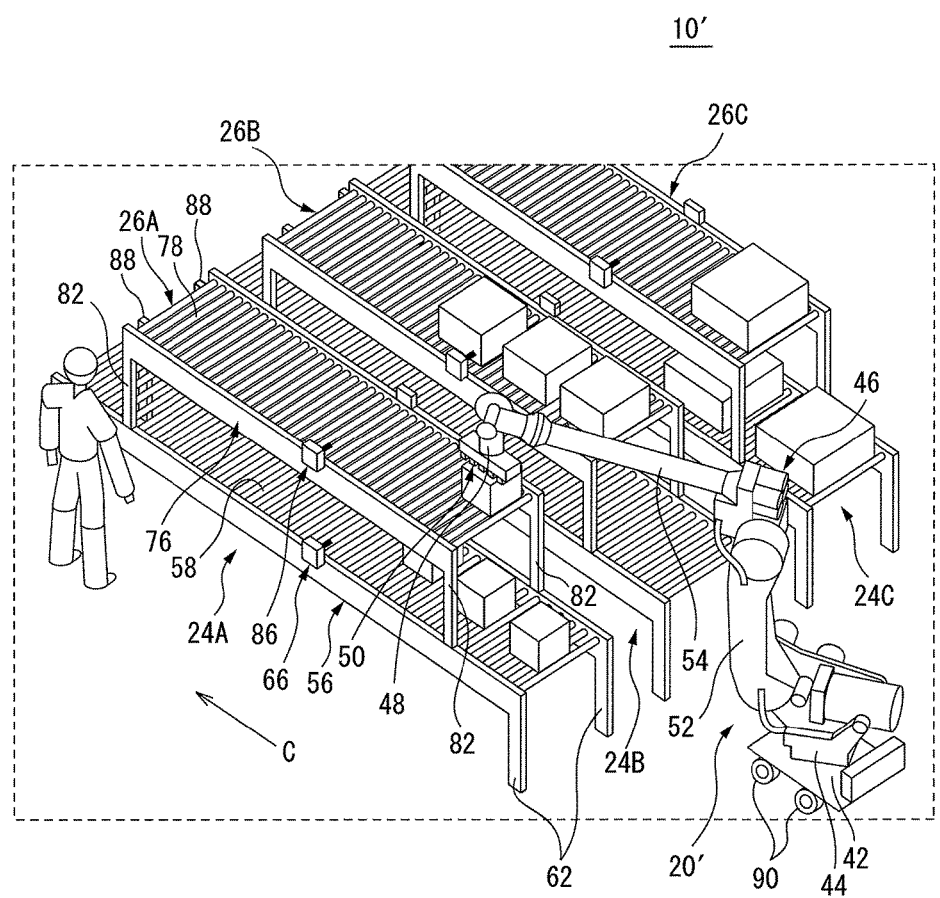
FIG. 11 is a perspective view of a sorting robot, a first buffer conveyor, and a second buffer conveyor, which constitute a palletizing system according to another embodiment.

Such an embodiment will be described with reference to FIG. 11. A palletizing system 10' is different from the palletizing system 10 in the feature wherein the palletizing system 10' includes a sorting robot 20', and buffer conveyors 24A, 26A, 24B, 26B, 24C, and 26C.

The sorting robot 20' is different from the sorting robot 20 in the feature wherein the sorting robot 20' further includes a travel device 90. The travel device 90 is provided at the bottom of the robot base 42, and configured to horizontally move the robot base 42 in response to a command from the sorting robot controller 22.

By this travel device 90, the main body (i.e., the robot base 42, the revolving drum 44, the robot arm 46, the wrist 48, and the end effector 50) of the sorting robot 20' can be moved in the horizontal direction.

Each of the buffer conveyors 24A, 24B, and 24C has a configuration the same as the above-mentioned first buffer conveyor 24. Specifically, each of the buffer conveyors 24A, 24B, and 24C includes the support frame 56, the movable section 58, and the driving section 60.

Further, each of the buffer conveyors 26A, 26B, and 26C has a configuration the same as the above-mentioned second buffer conveyor 26. Specifically, each of the buffer conveyors 26A, 26B, and 260 includes the support frame 76, the movable section 78, and the driving section 80.

The mounting position of the buffer conveyor 26A with respect to the buffer conveyor 24A is identical to the mounting position of the second buffer conveyor 26 with respect to the first buffer conveyor 24. Thus, the buffer conveyor 26A is disposed vertically upward of the buffer conveyor 24A.

Further, the upstream end of the buffer conveyor 26A is spaced in the conveyance direction C from the upstream end of the buffer conveyor 24A, and the downstream end of the buffer conveyor 24A is spaced in the conveyance direction C from the downstream end of the buffer conveyor 26A.

The same is true in the mounting position of the buffer conveyor 26B with respect to the buffer conveyor 24B, and the mounting position of the buffer conveyor 26C with respect to the buffer conveyor 24C.

The palletizing system 10' loads a first type of article $A_1$, a second type of article $A_2$, a third type of article $A_3$, a fourth type of article $A_4$, a fifth type of article $A_5$, and a sixth type of article $A_6$ on the pallet B.

The palletizing system 10' executes the flows shown in FIGS. 7 to 10 as in the palletizing system 10. Specifically, at step S2 in FIG. 7, the type detection sensor 18 detects the type of article $A_1$, $A_2$, $A_3$, $A_4$, $A_5$, or $A_6$ imaged at step S1.

At step S12 in FIG. 8, the sorting robot controller 22 operates the sorting robot 20' so as to sort the articles $A_1$, $A_2$, $A_3$, $A_4$, $A_5$, and $A_6$ according to the type of article specified at step S2, and place the sorted articles on the buffer conveyors 24A, 26A, 24B, 26B, 24C, and 26C.

Specifically, the sorting robot controller 22 sorts the articles so as to place the article $A_1$ on the buffer conveyor 24A, the article $A_2$ on the buffer conveyor 26A, the article $A_3$ on the buffer conveyor 24B, the article $A_4$ on the buffer conveyor 26B, the article $A_5$ on the buffer conveyor 24C, and the article $A_6$ on the buffer conveyor 26C.

At this time, the sorting robot controller 22 operates the travel device 90 depending on the position of the buffer conveyor 24A, 26A, 24B, 26B, 24C or 26C on which the article $A_1$, $A_2$, $A_3$, $A_4$, $A_5$, or $A_6$ is placed, so as to appropriately move the robot base 42 in the horizontal direction. The article $A_1$ may have a dimension larger than the article $A_2$, the article $A_3$ may have a dimension larger than the article $A_4$, and the article $A_5$ may have a dimension larger than the article $A_6$.

Note that, although not illustrated, the palletizing system 10' includes a loading robot having the robot base 42, the revolving drum 44, the robot arm 46, the wrist 48, the end effector 50, and the travel device 90.

At steps S46 and S51 in FIG. 10, the loading robot controller 36 operates the travel device 90 so as to appropriately move the robot base 42 in the horizontal direction, and picks us the articles $A_1$, $A_2$, $A_3$, $A_4$, $A_5$, and $A_6$ from the buffer conveyors 24A, 26A, 24B, 26B, 24C, and 26C, and loads the articles on the pallet B.

Note that, the travel device 90 can also be applied to the sorting robot 20 or the loading robot 34 shown in FIG. 1.

Further, the conveyance direction B of the supply conveyor 14 and the conveyance direction C of the buffer conveyors 24 and 26 may be different from each other. Further, the conveyance direction of the first buffer conveyor 24 and the conveyance direction of the second buffer conveyor 26 may be different from each other. Further, the second buffer conveyor 26 may be provided integrally with the first buffer conveyor 24 (i.e., as one piece).

Further, the downstream end of the second buffer conveyor 26 may be located at the same position as the downstream end of the first buffer conveyor 24 in the conveyance direction C, or may be spaced in the conveyance direction C from the downstream end of the first buffer conveyor 24. Further, the upstream end of the second buffer conveyor 24 may be located at the same position as the upstream end of the second buffer conveyor 26 in the conveyance direction C, or may be spaced in the conveyance direction C from the upstream end of the second buffer conveyor 26.

Further, the first buffer conveyor 24 and the second buffer conveyor 26 may have the same length in the conveyance direction C, or the second buffer conveyor 26 may be longer than the first buffer conveyor 24.

Further, the type detection sensor 18 may have a dimension measurement instrument for calculating the dimension of the article $A_1$ or $A_2$ by using e.g. a laser or electromagnetic wave.

If the type detection sensor 18 is configured to be able to measure the dimension of the article $A_1$ or $A_2$, but be not able to calculate the position and posture of the article $A_1$ or $A_2$, the article $A_1$ or $A_2$ is placed on the supply conveyor 14 at a predetermined position and posture. Alternatively, a positioning means (e.g., jig) for positioning the article $A_1$ or $A_2$ at a predetermined position and posture may be provided in the supply conveyor 14.

Further, the article detection sensor 30, the article detection sensor 32, or the proximity sensor 74 may have an OPT sensor, a laser displacement gauge, or a three-dimensional vision sensor.

Further, the article detection sensor 32 may be omitted. In this case, at steps 25 and 32 in FIG. 9, the buffer conveyor controller 28 may determine whether the articles $A_1$ and $A_2$ are conveyed to the downstream ends of the buffer conveyors 24 and 26 from the number of rotations of the servomotors of the driving sections 60 and 80, as in step S4.

Further, the supply conveyor controller 16, the sorting robot controller 22, the buffer conveyor controller 28, and the loading robot controller 36 may be incorporated in the system controller 12. In this case, the system controller 12 functions as these components.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

Regarding the order of operations, such as actions, sequences, steps, processes, and stages, in the devices, systems, programs, and methods indicated in the claims, specification and drawings, it should be noted that the terms "before", "prior to", etc. are not explicitly described, and any order can be realized unless the output of a previous operation is used in the subsequent operation. Regarding the processing in the claims, specification, and drawings, even when the order of operations is described using the terms "first", "next", "subsequently", "then", etc., for convenience, maintaining this order is not necessarily essential for working the inventions.

The invention claimed is:

1. A palletizing system for loading a plurality of types of articles on a pallet, the palletizing system comprising:
   a supply conveyor configured to convey a first type of article and a second type of article having a dimension different from that of the first type of article;
   a type detection sensor configured to detect the type of the article conveyed by the supply conveyor;
   a first buffer conveyor provided subsequent to the supply conveyor so as to convey the first type of article;
   a second buffer conveyor provided subsequent to the supply conveyor at vertically upward of the first buffer conveyor so as to convey the second type of article;
   a sorting robot configured to pick up the first type of article detected by the type detection sensor from the supply conveyor and place the first type of article on the first buffer conveyor, and configured to pick up the second type of article detected by the type detection sensor from the supply conveyor and place the second type of article on the second buffer conveyor; and
   a loading robot configured to pick up the first type of article from the first buffer conveyor and the second type of article from the second buffer conveyor, and load them on the pallet in accordance with a loading pattern which determines loading positions of the first type of article and the second type of article on the pallet.

2. The palletizing system according to claim 1, wherein the first buffer conveyor and the second buffer conveyor respectively convey the first type of article and the second type of article in the same conveyance direction, and
   wherein a length of the first buffer conveyor in the conveyance direction is longer than that of the second buffer conveyor.

3. The palletizing system according to claim 2, wherein a downstream end of the first buffer conveyor in the conveyance direction is spaced in the conveyance direction from a downstream end of the second buffer conveyor in the conveyance direction, and
   wherein an upstream end of the second buffer conveyor opposite the downstream end thereof is spaced in the conveyance direction from an upstream end of the first buffer conveyor opposite the downstream end thereof.

4. The palletizing system according to claim 1, wherein the first type of article has a dimension larger than that of the second type of article.

5. The palletizing system according to claim 1, wherein the sorting robot or the loading robot includes a robot main body and a travel device configured to move the robot main body.

* * * * *